(12) United States Patent
Biscardi et al.

(10) Patent No.: US 7,141,529 B2
(45) Date of Patent: Nov. 28, 2006

(54) METAL LOADED MICROPOROUS MATERIAL FOR HYDROCARBON ISOMERIZATION PROCESSES

(75) Inventors: Joseph A. Biscardi, Berkeley, CA (US); Darren P. Fong, Oakland, CA (US); Paul Marcantonio, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 11 days.

(21) Appl. No.: 10/393,817

(22) Filed: Mar. 21, 2003

(65) Prior Publication Data

US 2004/0186006 A1   Sep. 23, 2004

(51) Int. Cl.
  *B01J 27/182*   (2006.01)
(52) U.S. Cl. ............ 502/214; 502/74; 502/66
(58) Field of Classification Search ......... 502/60, 502/64, 68, 74, 208, 214
See application file for complete search history.

(56) References Cited

U.S. PATENT DOCUMENTS

| | | | |
|---|---|---|---|
| 3,140,249 A | | 7/1964 | Plank et al. |
| 3,140,251 A | | 7/1964 | Plank et al. |
| 3,140,253 A | | 7/1964 | Plank et al. |
| 4,094,821 A | | 6/1978 | McVicker et al. |
| 4,379,027 A | * | 4/1983 | Klosek et al. ............ 203/32 |
| 4,482,773 A | * | 11/1984 | Chu et al. ............... 585/481 |
| 4,485,185 A | * | 11/1984 | Onodera et al. .......... 502/71 |
| 4,605,488 A | * | 8/1986 | Chester et al. ........... 208/78 |
| 4,859,312 A | * | 8/1989 | Miller ................. 208/111.3 |
| 5,053,373 A | | 10/1991 | Zones |
| 5,187,133 A | * | 2/1993 | Yoshinari et al. ........ 502/66 |
| 5,252,527 A | | 10/1993 | Zones |
| 5,282,958 A | | 2/1994 | Santilli et al. |
| 5,397,454 A | | 3/1995 | Zones et al. |
| 5,707,601 A | | 1/1998 | Nakagawa |
| 6,576,120 B1 | * | 6/2003 | Van Ballegoy et al. .... 208/119 |
| 6,709,570 B1 | * | 3/2004 | Van Crijnen-Beers et al. ... 208/111.01 |

FOREIGN PATENT DOCUMENTS

WO    WO 00/29511   *   5/2000

* cited by examiner

*Primary Examiner*—Jonathan Johnson
(74) *Attorney, Agent, or Firm*—Penny L. Prater

(57) ABSTRACT

The invention is directed to a method of making a catalyst comprising an intermediate pore size molecular sieve, preferably a zeolite of the MTT or TON type. SSZ-32 and ZSM-22 are examples of such molecular sieves. This catalyst is modified with a metal or metals selected from the group consisting of Ca, Cr, Mg, La, Ba, Pr, Sr, K and Nd. The catalyst is additionally loaded with a Group VII metal or metals for hydrogenation purposes. The catalyst is suitable for use in a process whereby a feed including straight chain and slightly branched paraffins having 10 or more carbon atoms is isomerized.

9 Claims, No Drawings

METAL LOADED MICROPOROUS MATERIAL FOR HYDROCARBON ISOMERIZATION PROCESSES

FIELD OF THE INVENTION

This invention is directed to a method of making a catalyst comprising an intermediate pore size zeolite, the catalyst being suitable for use in isomerizing a feed which includes straight chain and slightly branched paraffins having 10 or more carbon atoms.

BACKGROUND OF THE INVENTION

The production of Group II and Group III base oils employing hydroprocessing has become increasing popular in recent years. Catalysts that demonstrate improved isomerization selectivity and conversion are continually sought. As discussed in U.S. Pat. No. 5,282,958, col. 1–2, the use of intermediate pore molecular sieves such as ZSM-22, ZSM-23, ZSM-35, SSZ-32, SAPO-11, SAPO-31, SM-3, SM-6 in isomerization and shape-selective dewaxing is well-known. Other typical zeolites useful in dewaxing include ZSM-48, ZSM-57, SSZ-20, EU-I, EU-13, Ferrierite, SUZ-4, theta-1, NU-10, NU-23, Nu-87, ISI-1, ISI-4, KZ-1, and KZ-2.

U.S. Pat. Nos. 5,252,527 and 5,053,373 disclose a zeolite such as SSZ-32 which is prepared using an N-lower alkyl-N'-isopropyl-imidazolium cation as a template. U.S. Pat. No. 5,053,373 discloses a silica to alumina ratio of greater than 20 to less than 40 and a constraint index, after calcination and in the hydrogen form of 13 or greater. The zeolite of U.S. Pat. No. 5,252,527 is not restricted to a constraint index of 13 or greater. U.S. Pat. No. 5,252,527 discloses loading zeolites with metals in order to provide a hydrogenation-dehydrogenation function. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred. A method for preparation of MTT-type zeolites such as SSZ-32 or ZSM-23 using small neutral amines is disclosed in U.S. Pat. No. 5,707,601.

U.S. Pat. No. 5,397,454 discloses hydroconversion processes employing a zeolite such as SSZ-32 which has a small crystallite size and a constraint index of 13 or greater, after calcinations and in the hydrogen form. The catalyst possess a silica to alumina ratio of greater than 20:1 and less than 40:1.

SUMMARY OF THE INVENTION

The instant invention discloses a process for dewaxing a hydrocarbon feed to produce an isomerized product, the feed includes straight chain and slightly branched paraffins having 10 or more carbon atoms. The feed is contacted under isomerization conditions in the presence of hydrogen with a catalyst comprising an intermediate pore size molecular sieve. One embodiment of the catalyst is prepared according to the following steps:

(a) synthesizing 10 ring molecular sieve having one-dimensional pores, said pores having a minor axis between about 4.2 A and about 4.8 A and a major axis between about 5.0 A and about 7.0 A;

(b) mixing said molecular sieve with a refractory inorganic oxide carrier precursor and an aqueous solution to form a mixture;

(c) extruding or forming the mixture from step (b) to form an extrudate or formed particle;

(d) drying the extrudate or formed particle of step (c);

(e) calcining the dried extrudate or formed particle of step (d);

(f) impregnating the calcined extrudate or formed particle of step (e) with at least one metal selected from the group consisting of Ca,Cr,Mg,La,Ba,Na,Pr,Sr,K, and Nd to prepare a metal loaded extrudate or formed particle;

(g) drying of the metal loaded extrudate or formed particle of step (f), (h) further impregnating of the metal loaded extrudate or formed particle of step (g) with a Group VIII metal to prepare a catalyst precursor;

(i) drying the catalyst precursor of step (h);

(j) calcining the dried catalyst precursor of step (i) to form a finished bound dewaxing catalyst.

DETAILED DESCRIPTION OF THE PREFERRED EMBODIMENT

Catalyst Preparation

The catalyst of the instant invention is comprised of a molecular sieve(s) such as those discussed here. The catalyst employed may comprise from 5 to 60wt % zeolite or molecular sieve. Molecular sieves may be of the AEL type, such as SAPO-11, SAPO-31, SM-3, SM-6 as well as zeolite type materials of the MTT or TON type. They may also be of the FER type. 'Molecular sieves' as used herein can include 'zeolites'. The terms MTT type zeolite, MTT molecular sieve, or variations thereof refers to the framework structure code for a family of molecular sieve materials. The Structure Commission of the International Zeolite Association (IZA) gives codes consisting of three alphabetical letters to zeolites (a type of molecular sieve) having a structure that has been determined. Zeolites having the same topology are generically called by such three letters. The code MTT is given to the structure of molecular sieves including: ZSM-23, SSZ-32, EU-13, ISI-4, and KZ-1. Thus zeolites having a framework structure similar to that of ZSM-23 and SSZ-32 are named a MTT-type zeolite. The code TON is given to the molecular sieves including; Theta-1, ISI-1, KZ-2, NU-10, and ZSM-22. The parameters of MTT/TON type molecular sieves are further described in the Atlas of Molecular Sieves which is published by the IZA following the rules set up by an IUPAC Commission on Zeolite Nomenclature in 1978. MTT and TON have related structures and both have unidimensional channels. Also useful in the instant invention are zeolite type materials of the FER type, which include FU-9, ZSM-35, ISI-6, and NU-23. ZSM-23, SSZ-32, ZSM-22 and ZSM-35 are all constrained intermediate pore zeolites. Another material of use is SSZ-54, an intergrowth MTT and TON zeolite structures. It is described in co-pending application Ser. No. 10/186905, "Zeolite SSZ-54 Composition of Matter and Synthesis Thereof."

The term MTT/TON-type zeolites used herein means silicate-series crystalline microporous materials, which include crystalline alumino-silicates, crystalline metallo-silicates, and crystalline metallo-aluminosilicates having the (MTT/TON) structure. Metallo-silicates and metallo-aluminosilicates mean herein aluminosilicates, part or all of aluminum therein being replaced with other metals than aluminum, other metals which include gallium, iron, titanium, boron, cobalt, and chromium. Elements forming the framework structure other than silicon and oxygen, for example, aluminum, gallium, iron, titanium, boron, cobalt, zinc, magnesium, and chromium are herein defined as heteroatoms.

The molecular sieve described above is converted to its acidic form and then is mixed with a refractory inorganic oxide carrier precursor and an aqueous solution to form a mixture. The aqueous solution is preferably acidic. The solution acts as a peptizing agent. The carrier (also known as a matrix or binder) may be chosen for being resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes.

Zeolites or molecular sieves are commonly composted with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel. In the instant invention, the preferred matrix materials are alumina and silica. It is possible to add metals for the enhancement of isomerization selectivity during the actual synthesis of the zeolite, as well as during later steps in catalyst preparation. Methods of preparation include solid state ion exchange which is achieved by thermal means, spray drying with a metal salt solution, and preparation of a slurry in a salt solution. The slurry may be filtered to retrieve the zeolite, now loaded with metal.

Generally it is desirable to minimize the amount of molecular sieve in the finished catalyst for economic reasons. Lower levels of the molecular sieve in the finished catalyst are desirable if good activity and selectivity results are achieved. In the present invention the preferred level of molecular sieve is between 5 and 60 wt %. Preferred levels of molecular sieve may vary for different molecular sieve types.

Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i. e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

The mixture of molecular sieve and binder can be formed into a wide variety of physical shapes. Generally speaking, the mixture can be in the form of a powder, a granule, or a molded product, such as an extrudate having a particle size sufficient to pass through a 2.5-mesh (Tyler) screen and be retained on a 48-mesh (Tyler) screen. In cases where the catalyst is molded, such as by extrusion with an organic binder, the mixture can be extruded before drying, or dried or partially dried and then extruded. The zeolite can also be steamed; steaming helps stabilize the crystalline lattice to attack from acids. The dried extrudate is then thermally treated, using calcination procedures.

Calcination temperature may range from 390 to 1100 F. Calcination may occur for periods of time ranging from 0.5 to 5 hours, or more, to produce a catalytically active product especially useful in hydrocarbon conversion processes.

The calcined extrudate or formed particle is then loaded with at least one metal selected from the group consisting of Ca, Cr, Mg, La, Na, Pr, Sr, K and Nd. These metals are known for their ability to modify performance of the catalyst by reducing the number of strong acid sites on the catalyst and thereby lowering the selectivity for cracking versus isomerization. Modification may also involve increased metal dispersion such that acid or cation sites in the catalysts are blocked. Metals loading may be accomplished by a variety of techniques, including impregnation and ion exchange.

Typical ion exchange techniques involve contacting the extrudate or particle with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the extrudate or particle is calcined. Calcination is carried out in a temperature range from 400 to 1100° F.

Following contact with the salt solution of the desired replacing cation, the extrudate or particle is dried at temperatures ranging from 149 F. to about 599 F. The extrudate or particle is then further loaded using a technique such as impregnation, with a Group VIII metal to enhance the hydrogenation function. It may be desirable to coimpregnate a modifying metal and Group VIII metal at once, as disclosed in U.S. Pat. No. 4,094,821. The Group VIII metal is preferably platinum, palladium or a mixture of the two. After loading, the material can be calcined in air or inert gas at temperatures from 500 to 900 F.

Feeds

The instant invention may be used to dewax a variety of feedstocks ranging from relatively light distillate fractions such as kerosene and jet fuel up to high boiling stocks such as whole crude petroleum, reduced crudes, vacuum tower residua, cycle oils, synthetic crudes (e.g., shale oils, tars and oil, etc.), gas oils, vacuum gas oils, foots oils, Fischer-Tropsch derived waxes, and other heavy oils. Straight chain n-paraffins either alone or with only slightly branched chain paraffins having 16 or more carbon atoms are sometimes referred to herein as waxes. The feedstock will often be a $C_{10}+$ feedstock generally boiling above about 350 F, since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230[deg] C. (450[deg] F.), more usually above 315[deg] C. (600[deg] F.). Hydroprocessed stocks are a convenient source of stocks of this kind and also of other distillate fractions since they normally contain significant amounts of waxy n-paraffins. The feedstock of the present process will normally be a $C_{10}+$ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock.

Typical feedstocks include hydrotreated or hydrocracked gas oils, hydrotreated lube oil raffinates, brightstocks, lubricating oil stocks, synthetic oils, foots oils, Fischer-Tropsch synthesis oils, high pour point polyolefins, normal alphaolefin waxes, slack waxes, deoiled waxes and microcrystalline waxes.

Conditions

The conditions under which the isomerization/dewaxing process of the present invention is carried out generally include a temperature which falls within a range from about 392° F. to about 800° F., and a pressure from about 15 to about 3000 psig. More preferably the pressure is from about 100 to about 2500 psig. The liquid hourly space velocity during contacting is generally from about 0.1 to about 20, more preferably from about 0.1 to about 5. The contacting is preferably carried out in the presence of hydrogen. The hydrogen to hydrocarbon ratio preferably falls within a range from about 2000 to about 10,000 standard cubic feet $H_2$ per barrel hydrocarbon, more preferably from about 2500 to about 5000 standard cubic feet $H_2$ per barrel hydrocarbon.

The product of the present invention may be further treated as by hydrofinishing. The hydrofinishing can be conventionally carried out in the presence of a metallic hydrogenation catalyst, for example, platinum on alumina. The hydrofinishing can be carried out at a temperature of from about 374 F to about 644 F and a pressure of from about 400 psig to about 3000 psig. Hydrofinishing in this manner is described in, for example, U.S. Pat. No. 3,852,207 which is incorporated herein by reference.

EXAMPLES

Example 1

The hydroisomerization of n-hexadecane is tested in terms of looking for catalysts which give a high selectivity to isomerized nC-16 over cracked products. These results can be anticipated to be of value in selecting useful catalysts for n-paraffin isomerization of molecules of $C_{10}$ and greater. An initial test of this type has been described in U.S. Pat. No. 5,282,958.(see col. 5, lines 25–55).

Here reactions were run under isothermal conditions to remove temperature effects. Conversion could be adjusted with changes in space velocity. All materials were first reduced in flowing hydrogen at 630° F. for 2 hours. Once the run was begun the conditions were to use 0.50 grams of catalyst loaded with 0.5 wt % Pd prepared as 20–40 mesh chips and packed into a downflow reactor. The hydrogen pressure was 1200 psig, flowing at 160 ml /min.

The Pd incorporation was carried out by ion-exchange at 160° F. for a minimum of 5 hours followed by filtration, washing, drying and calcination at 900° F.

Under these reaction conditions, the selectivity of a Pd SSZ-32 catalyst for isomerized $nC_{16}$ was 69% at a conversion of 93%.

Example 2

A modified SSZ-32 catalyst was made by treatment with an additional metal to modify the acidity of the zeolite. In cases where ion-exchange could be used a procedure was followed of (1) introducing 10 grams of zeolite into 300 cc of water heated to 70° C., (2) stirring for 10 minutes and (3) then introducing the metal salt for exchange. In one example, 1.00 grams of $Ca(OH)_2$ was added and the resulting exchange efficiency turned out to be 70%.

After filtration, washing and drying the material was calcined to 900° F. before Pd treatment as in Example 1. Running the catalyst as demonstrated in Example 1 but at 570° F. resulted in a selectivity of 80% for isomerized $nC_{16}$ at 93% conversion which compares with the catalyst of Example 1 yielding a selectivity of 69% under the same conversion and temperature of run. The treatment of the zeolite with $Ca(OH)_2$ has resulted in an improved isomerization catalyst for $nC_{16}$ feed.

Examples 3–11

A series of catalyst were made as in Example 2 but using different modifying metals to demonstrate the range of conditions which might be considered. The addition of modifying metals was selected such that a ratio of 0.3–0.4 metal/Al sites in the SSZ-32 zeolite was achieved. The zeolite used had $SiO_2/Al_2O_3$ of 35.

TABLE 1

| EX # | METAL added | n $C_{16}$ CONVERSION | ISOMERIZATION SELECTIVITY |
|---|---|---|---|
| 3 | none | 92% (570° F.) | 74% |
| 4 | Ca | same | 83% |
| 5 | Pr | same | 81% |
| 6 | Sr | same | 79% |
| 7 | La | same | 79% |
| 8 | Mg | same | 79% |
| 9 | Na | same | 79% |
| 10 | K | same | 77% |
| 11 | Cr | same | 76% |

It can be seen that several metal treatments can improve the isomerization selectivity for n $C_{16}$ by amounts typically as great as 5%. In general, the effect observed seems to be that the metal modifier has an ability to affect the combined Pd/zeolite catalyst in a manner which reduces hydrocarbon scission to make light gases, thereby enhancing isomerization.

Example 12

A sample of TON zeolite was made as described in Nakagawa and Zones (U.S. Pat. No. 5, 707,600, col.10, lines 50–61). The zeolite was then treated as in Examples 1 and 8. Running the zeolites as in Example 8 in the hexadecane conversion test, it was found that modification of the TON zeolite with metal also led to improved isomerization selectivity. The improved catalyst gave a 69% selectivity over a basecase ( no metal added ) of 64% for this particular TON sample. Again a roughly 5% improvement was seen. This experiment demonstrates that other 1D, 10-ring zeolites can be advantageously modified.

Examples 13–16

In modifying the zeolite with additional metals it has been seen that optimum levels can be described for modification. In the example which follow in Table 2, it can be seen that for a Ca treatment and subsequent catalyst testing as in Example 4, increased addition of Ca results in improved isomerization selectivity up to a point. It can be anticipated that a number of the other metals in Examples 4–11 will show a similar behavior, though the optimization value will not be identical in each case.

TABLE 2

| Ex # | Ca/Al in SSZ-32 Atomic ratio | n $C_{16}$ Conversion | Isomerization Selectivity |
|---|---|---|---|
| 13 | 0.00 | 93% | 69% |
| 14 | 0.25 | 93% | 77% |
| 15 | 0.35 | 93% | 82% |
| 16 | 0.58 | 93% | 80% |

Example 15 depicts the optimum ratio for Ca/Al on Pd/Ca/H-SSZ-32. Optimum ratios will vary for different metals used on SSZ-32. For example, 0.35 Sr/Al on SSZ-32 might not result in the best conversion and selectivity. Optimum ratios vary for each zeolite and metal pairing.

Example 17

These metal modification treatments can be of value on zeolites which were bound with alumina, silica or other refractories. The H-SSZ-32 zeolite was bound with alumina by use of Catapal B and a peptizing procedure ($HNO_3$) as is typically practiced by those skilled in the art, and is described in U.S. Pat. No. 5,376,260, col. 9, lines 65-Col. 11, line 19). The extrudate was prepared from forcing the peptized mixture through a die to produce 1/16 inch material. This was subsequently dried and then calcined to a variety of temperatures. The subsequent treatment with Pd and then testing for hexadecane isomerization showed that a catalyst made from extrudate calcined below 1100° F. (a rather typical extrudate calcination temperature) performed better.

Following the procedure of Example 17, an extrudate was formed at 65% zeolite and calcined to 700° F. before the Pd was added and the material re-calcined. Another catalyst was prepared from this extrudate where a modifying metal was added before the subsequent Pd steps. The modification was such that the Ca/Al atomic ratio in the zeolite was 0.45. The isomerization selectivity for the Pd/zeolite/extrudate system without metal modification was 67% at 92% conversion, while the modified catalyst improved to a selectivity of 76% under the same conditions. This example demonstrates that the advantages of metal modification of the 10-ring 1D zeolites can improve their paraffin isomerization ( for $C_{10}$ and larger) capability even when they are bound with a refractory oxide.

Example 18

An extrudate was prepared as in Example 17 but the zeolite content was reduced to 45%. This material was split into 2 portions. One was processed through to a catalyst as in Example 17 for the Pd-only material. The second portion contained, both Ca and Pd and was prepared as its counterpart in Example 17. The non-metal modified catalyst at 45wt % zeolite content 55wt % alumina performed below that of Example 17, giving only about 50% isomerization selectivity at 93% conversion. However, the same 45% zeolite material, modified with calcium showed a jump in selectivity to near 75%. In comparison with Example 17, these results show that the metal-modification approach is effective in raising the isomerization selectivity for a zeolite in a binder even as the zeolite content is changed.

Examples 19–21

The performance of the extrudate can also be beneficially affected by carefully selected steaming. The sequence of extrudates was steamed at 900° F. for a series of run times and then converted into finished catalysts and tested for n $C_{16}$ isomerization selectivity at 570° F.

TABLE 3

| EX # | HOURS STEAMED | n $C_{16}$ CONVERSION | ISOMERIZATION SELECTIVITY |
|---|---|---|---|
| 19 | 0 | 92% | 67% |
| 20 | 1 | 92% | 50% |
| 21 | 4 | 92% | 64% |
| 22 | 8 | 92% | 70% |

What is claimed is:

1. A method of preparing a dewaxing catalyst suitable for use in a process for dewaxing a hydrocarbon feed to produce an isomerized product, the feed including straight chain and slightly branched chain paraffins having 10 or more carbon atoms, the method of preparation comprising the following steps:

(a) synthesizing a one-dimensional 10 ring molecular sieve having one-dimensional pores, said pores having a minor axis between about 4.2 A and about 4.8 A and a major axis between about 5.0 A and about 7.0 A, wherein the molecular sieve is subsequently converted to acidic form, the molecular sieve being selected from the group consisting of SAPO-11, SAPO-31, SAPO-41, SM-3, SM-6, SSZ-32, ZSM-23, EU-13, ISI-4, KZ-1, Theta-1, ISI-1, KZ-2, NU-10 and ZSM-22, (b) mixing said molecular sieve with a refractory inorganic oxide carrier precursor and an aqueous solution to form a mixture, the mixture having a molecular sieve content from about 5 to about 60 wt %;

(c) extruding or forming the mixture from step (b) to form an extrudate or formed particle;

(d) drying the extrudate or formed particle of step (c);

(e) calcining the dried extrudate or formed particle of step (d);

(f) modifying the calcined extrudate or formed particle of step (e) with at least one metal selected from the group consisting of Ca,Cr,Mg,La,Ba,Na,Pr,Sr,K, and Nd to prepare a metal modified extrudate or formed particle wherein the metals modification enhances the n- paraffin isomerization selectivity of the catalyst;

(g) drying of the metal loaded extrudate or formed particle of step (f), (h) loading of the metal modified extrudate or formed particle of step(g) with a Group VIII metal to prepare a catalyst precursor;

(i) drying the catalyst precursor of step (h);

(j) calcining the dried catalyst precursor of step (i) to form a finished bound dewaxing catalyst.

2. A catalyst prepared by the method of claim 1.

3. The method of claim 1 wherein at least one modifying metal, added to enhance the n-paraffin isomerization selectivity of the catalyst is selected from the group consisting of Ca, Cr, Mg, La, Ba, Na, Pr, Sr, K, and Nd and is added to the molecular sieve during step (a), during step (b), or at some point in between step (a) and step (b).

4. The method of claim 1, wherein the aqueous solution of step (b) is acidic.

5. The method of claim 1, in which the calcination of step (e) occurs at a temperature of no greater than 1100° F.

6. The method of claim 5, in which the calcinations of step (e) occurs at a temperature of no greater than 700° F.

7. The method of claim 1, in which the refractory inorganic oxide is selected from the group consisting of alumina and silica.

8. The method of claim 1, wherein the extrudate is steamed prior to metal loading.

9. The process of claim 1, wherein Group VIII metals are selected from the Group consisting of platinum and palladium, and mixtures thereof.

* * * * *